(No Model.) 2 Sheets—Sheet 1.

T. HUDDLESTONE.
COMBINED SULKY PLOW AND CULTIVATOR.

No. 302,731. Patented July 29, 1884.

WITNESSES:

INVENTOR:
T. Huddlestone
BY Munn & Co
ATTORNEYS.

(No Model.) 2 Sheets—Sheet 2.

T. HUDDLESTONE.
COMBINED SULKY PLOW AND CULTIVATOR.

No. 302,731. Patented July 29, 1884.

WITNESSES:

INVENTOR:
T. Huddlestone
BY Munn & Co.
ATTORNEYS.

UNITED STATES PATENT OFFICE.

THOMAS HUDDLESTONE, OF PORTAGE LA PRAIRIE, MANITOBA, CANADA.

COMBINED SULKY-PLOW AND CULTIVATOR.

SPECIFICATION forming part of Letters Patent No. 302,731, dated July 29, 1884.

Application filed October 30, 1883. (No model.)

*To all whom it may concern:*

Be it known that I, THOMAS HUDDLESTONE, of Portage la Prairie, in the county of Portage la Prairie, in the Province of Manitoba and Dominion of Canada, have invented a new and useful Improvement in Combined Sulky-Plows and Cultivators, of which the following is a full, clear, and exact description.

Reference is to be had to the accompanying drawings, forming a part of this specification, in which similar letters of reference indicate corresponding parts in all the figures.

Figure 1:
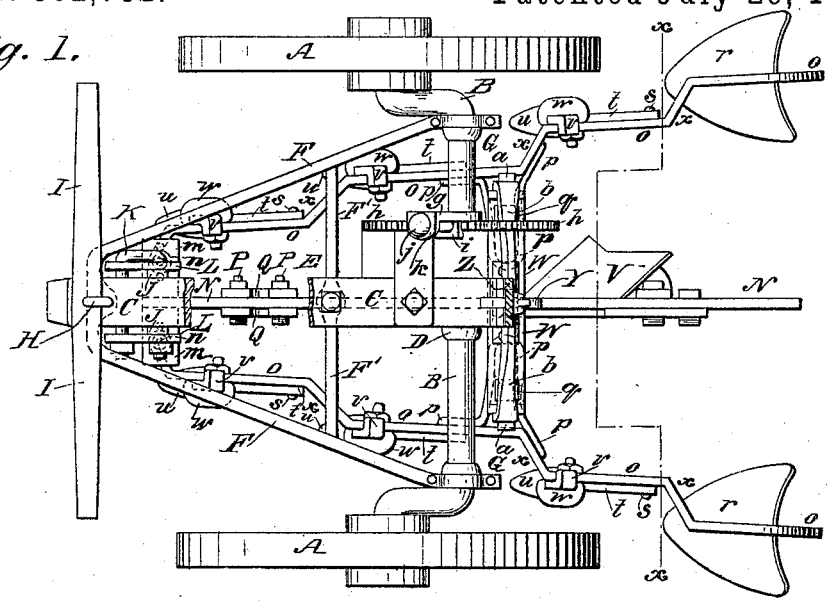
Figure 2:
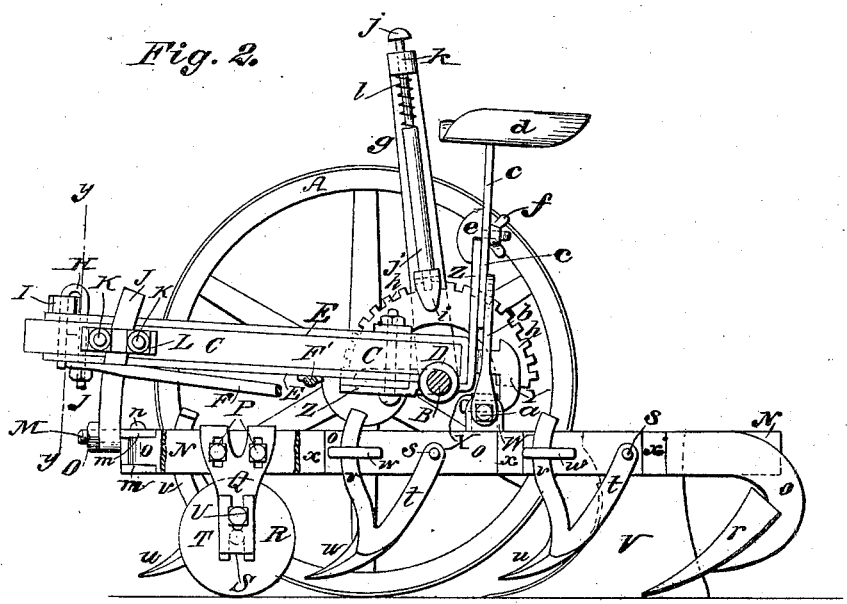
Figure 3:
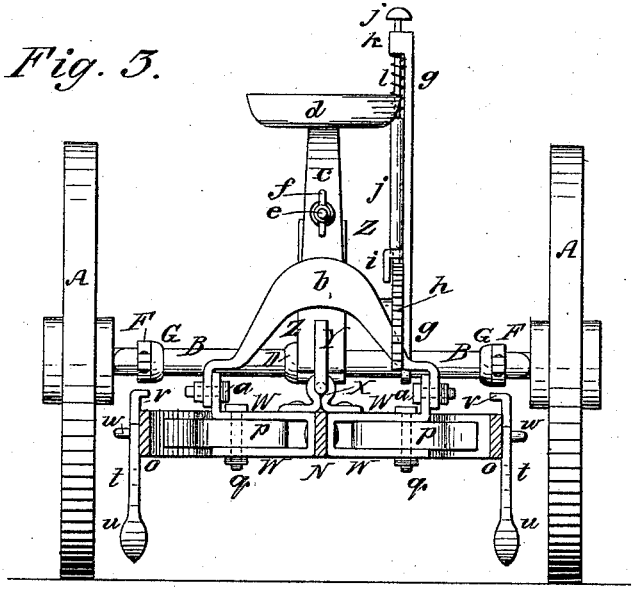
Figure 4:
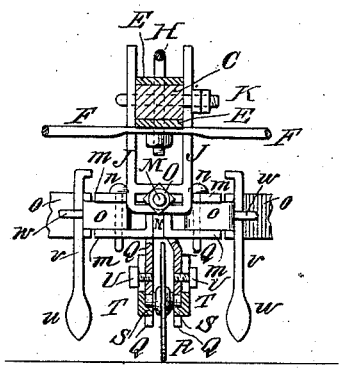

Figure 1, Sheet 1, is a plan view of my improvement, the seat-standard being shown in section, and part being broken away. Fig. 2, Sheet 1, is a side elevation of the same, partly in section, and part being broken away. Fig. 3, Sheet 2, is a sectional rear elevation of the same, taken through the line $x\ x$, Fig. 1. Fig. 4, Sheet 2, is a sectional front elevation of the same, taken through the line $y\ y$, Fig. 2.

The object of this invention is to provide combined plows and cultivators constructed in such a manner that they can be readily adjusted for any desired kind of plowing.

A further object of this invention is to promote convenience in adjusting and controlling combined plows and cultivators.

The invention consists of the sundry combinations of parts, substantially as hereinafter fully described, and pointed out in the claims.

A are the wheels, the axle B of which is bent twice at right angles at the inner ends of the wheel-hubs, so that the plows can be raised and lowered by turning the said axle in its bearings. The central part of the axle B rocks in bearings formed in or attached to the lower side of the rear end of the tongue C, and is kept from longitudinal movement in said bearings by shoulders or collars D, formed upon or attached to the said axle. The lower and upper sides to the tongue C are faced with a metal plate, E, passing along the said sides and over the rear end of the said tongue. The connection between the tongue C and the axle B is strengthened by the braces F, the rear ends of which, or bearings formed upon or attached to the said ends, are connected to the axle B at its inner angles, where they are kept in place by shoulders or collars G, formed upon or attached to the said axle. The forward ends of the braces F are secured to the lower side of the tongue C by a bolt and nut, H, which may be the bolt and nut that secure the double-tree I to the said tongue. The braces F are stiffened and strengthened by a cross-brace, F', the ends of which are secured to the middle parts of the said braces, and its middle part is bolted to the lower side of the tongue C.

J is a U-shaped clevis, the arms of which are secured to the opposite sides of the tongue C by a U-bolt, K, and a yoke, L, or other suitable clamp, so that the said clevis will be held securely, and can be readily adjusted by loosening the nuts of the said bolt K.

In the lower part or bend of the clevis J is formed a horizontal cross-groove to receive the bolt M, formed upon the forward end of the central plow-beam, N, and which has a screw-thread formed upon it to receive the nut O, so that by tightening the nut O the bend of the clevis J will be clamped between the nut O and the forward end of the beam N to hold the said forward end of the beam securely in place. With this construction, by loosening the nut O, the forward end of the plow-beam N can be readily adjusted to cause the plow to take or leave land, as may be desired.

To the beam N, at a little distance from its forward end, are secured by bolts P the upper ends of the hangers Q, which are made wide to give them a stable bearing against the sides of the beam N, and are slotted vertically to receive the fastening-bolts P, so that the said hangers can be readily adjusted to regulate the depth to which the colter R enters the ground, and to take up the wear of the colter-journals. The journals of the colter R revolve in slots in the lower ends of the hangers Q, and are kept in place by the inwardly-projecting lugs S, formed upon the lower edges of the plates T, and which enter the said slots below the said journals. The upper parts of the plates T are slotted to receive the bolts U, so that by loosening the said bolts U the plates T can be raised to bring the lugs S closer to the journals of the colter R, and thus take up the wear. By this construction all wabbling of the colter R as its journals wear will be prevented.

To the rear part of the plow-beam N, at a suitable distance in the rear of the axle B, is securely bolted the plow V, which may be a turn-plow, a breaking-plow, or any other desired kind of a plow, as the work to be done may require. To the opposite sides of the plow-beam N, a little in the rear of the axle B, are bolted the bends of the U-shaped bars W, which are arranged with their arms one above the other, and to the inner parts of the upper arms are bolted the ends of a short bar, X. The bar X crosses the upper edge of the plow-beam N, and in its middle part, directly above the said plow-beam, is formed a socket to receive a forwardly-projecting arm formed upon the lower part of the bracket or hook Y, firmly attached to the upper arm of the angle-bar Z, the lower arm of which projects beneath and is firmly bolted to the lower side of the rear end of the tongue C. The hook Y and the socket-bar X are designed to sustain the greater part of the draft of the plow V, so as to relieve the clevis J from having to sustain the entire draft-strain. The upper arms of the U-bars W are made a little longer than the lower arms, and their outer ends are bent upward at right angles. To the upwardly-projecting ends of the said upper arms are hinged by bolts $a$ the ends of the arched bar $b$, the middle part of which is rigidly secured to the lower end of the seat-standard $c$. The standard $c$ is provided at its upper end with the driver's seat $d$, and at its middle part with a hook-bolt, $e$, to hook over the upper end of the angle-bar Z, and which is tightened upon the said bar to clamp the standard $c$ in place by a hand-nut, $f$. With this construction, when one of the wheels A is running in a furrow, by loosening the hook-bolt $e$ and turning the standard $c$ to one side until the seat $d$ comes to a level, the plows will also be brought to a level, the said plows turning upon the draft-hook Y as a pivot. With this construction, also, by loosening the hook-bolt $e$, the standard $c$ and the arched bar $b$ can be swung down into a horizontal position to give convenient access to the bolts for adjusting the plows. The arched bar $b$ can be provided with hook-bolts or other clamping-bolts, for connecting the said bar $b$ with the axle B when the said axle has been adjusted to cause the plows to work at the desired depth in the ground and the plows have been leveled, whereby the various parts of the machine will be rigidly connected, and the plows will be compelled to work at the same depth in the soil whether the soil be hard or loose. The axle B is turned to regulate the depth to which the plows enter the ground, and to raise the plows above the ground for convenience in passing from place to place by means of a lever, $g$, the lower end of which is rigidly attached to the said axle. The lever $g$ projects across a catch-bar, $h$, and is provided with a hook-arm or keeper, $i$, which overlaps the other side of the said catch-bar $h$, so as to keep the said lever in place against the side of the catch-bar $h$, which is secured to the side of the tongue C or to a bracket, an arm, or other support attached to the said tongue, and has teeth in its curved upper edge, with which engages the lower end of the pawl $j$, passing through a guide-hole in the shank of the keeper $i$. The pawl $j$ extends up along the side of the lever $g$, and its upper end is rounded, passes through a socket, $k$, formed upon or attached to the side of the upper end of the said lever $g$, and has a nut or knob screwed upon its upper end. The pawl $j$ is held down, holding its engaging end against the toothed edge of the catch-bar $h$, by a spiral spring, $l$, placed upon the upper part of the pawl $j$, with its upper end resting against the socket $k$ and its lower end resting against a shoulder, collar, or other stop formed upon or attached to the said pawl.

To the opposite sides of the forward end of the center beam, N, are secured by bolts or rivets the bends of two U-shaped bars, $m$, the arms of which have holes formed through them to receive the bolts or pins $n$. The bolts or pins $n$ also pass through holes or eyes in the forward ends of the side beams, $o$, interposed between the said arms. Several holes are formed in the arms of the U-bars $m$, to receive the bolts or pins $n$, so that the forward ends of the said beams $o$ can be adjusted wider apart or closer together, as may be required.

$p$ are U shaped bars placed between the arms of the U-bars W, and secured in place by bolts $q$, passing through the arms of the bars W and through the space between the arms of the bars $p$. The ends of the bars $p$ are bent outward to fit against the inner sides of the side beams, $o$, and are secured to the said beams by bolts or rivets. With this construction, by loosening the bolts $q$, the side beams, $o$, can be adjusted farther from or nearer to the center beam, N, as the work to be done may require, the said U-bars W $p$ being curved upon the arcs of circles having their centers at the pivoting-points of the said side beams, $o$, so that the said U-bars will always be parallel with each other and in proper position to be clamped together by the bolts $q$. The rear ends of the side beams, $o$, are curved downward and forward to bring them into proper positions to receive the shovel-plows $r$, which are secured in place by bolts or rivets.

To the side beams, $o$, at suitable distances apart, are secured by bolts or rivets $s$ the upper ends of the shanks or standards $t$, upon the lower ends of which are formed or to them are attached, cultivator plows or teeth $u$. To the lower parts of the shanks or standards $t$ are attached or upon them are formed, braces $v$, which pass up across the side beams, $o$, and are clamped to the sides of the said beams by hook-bolts $w$, passing through the said beams and hooking upon the said braces, so that by loosening the said bolts the standards $t$ can be readily adjusted to give any desired pitch to the said standards and plows. The side beams, $o$, are made with offsets $x$ between the standard t and between the last standard and the downwardly-curved rear ends of the said beams, as shown in Fig. 1, so as to bring the cultivator-teeth to the proper distance apart laterally.

In order to use the machine as a turning-plow, the side beams, o, are removed with their shovels by withdrawing the bolts n and the bolts q. When used as a cultivator, the plowshare V and the colter R of the central beam, N, are removed, the side beams with their shovels remaining in position; and to convert the machine into a shovel-plow or into a hiller the side or cultivator beams are elevated sufficiently to enable their forward blades or shovels to just clear the ground, when by properly manipulating the hand-lever g, the adjustment of the shovels r to the required depth is effected.

Having thus described my invention, I claim as new and desire to secure by Letters Patent—

1. In a combined sulky-plow and cultivator, the combination, with the central beam having laterally-projecting arms, the upper ones of which have upwardly-projecting ends, of the arched bar pivoted to said ends of said upper arms and secured about at its middle to the seat-standard, the hook secured to a support at the rear end of the tongue, and the socket-bar, fastened to said upper arms and receiving the hook, substantially as and for the purpose set forth.

2. In a combined sulky-plow and cultivator, the combination, with the tongue C and the center beam, N, of the clevis J, having horizontal slot, the clamp K L, and the rigid bolt M, substantially as herein shown and described, whereby the forward end of the said center beam is adjustably connected with the said tongue, as set forth.

3. In a combined cultivator and sulky-plow, the combination, with the central beam, having the laterally-projecting arms, the upper ones of which are bent upwardly at their outer ends, of the side beams connected to said arms, the socket-bar also secured to the latter, the seat-standard pivoted to a support at the rear end of the tongue, the yoke or arched bar secured to the seat-standard and pivoted to said upper ends of said upper arms, and the hook secured to the support at the rear end of said tongue and projecting into said socket-bar, substantially as and for the purpose set forth.

4. In a combined sulky-plow and cultivator, the combination, with the central beam, having laterally-projecting arms, of the arched bar connected to the upper ones of said arms and rigidly secured to the seat-standard, the latter being pivotally connected to a fixed support or bracket of the tongue, substantially as and for the purpose set forth.

5. In a combined sulky-plow and cultivator, the combination, with the angle-plate secured to the rear end of the tongue, of the central and side plow or shovel-beams, connected together and with the yoke or arched bar, which is connected to the arms of the central beam secured to the seat-standard, said standard being pivoted and adjustably connected to said angle-plate, substantially as and for the purpose set forth.

6. In a combined sulky-plow and cultivator, the combination, with the center beam, N, and the side beams, o, of the two pairs of U-bars W p and the clamping-bolts q, substantially as herein shown and described, whereby the rear parts of the said beams are connected securely and adjustably, as set forth.

7. In a combined sulky-plow and cultivator, the combination, with the crank-axle B, the hinged tongue C, and the plow-beams N o, of the angle-bar Z, the draft-hook Y, and the socket-bar X, substantially as herein shown and described, whereby the main draft-strain will be sustained, as set forth.

8. In a combined sulky-plow and cultivator, the combination, with the angle-bar Z, the plow-beams N o, and the U-bars W p, of the hinged arched bar b, the seat-standard c, and the hook-bolt e, substantially as herein shown and described, whereby the plow-beams can be readily leveled and will be securely held, as set forth.

9. The combination, with the rotary colter R, of the hangers Q, having slotted lower ends, and the plates T, having lugs S, projecting into the slots in the lower ends of the hangers, and supporting the journals of the colter, said plates T having slots in their upper ends, which receive fastening-bolts P, substantially as and for the purpose set forth.

THOMAS HUDDLESTONE.

Witnesses:
 TIMOTHY BARMBY,
 THOMAS B. DENTON.